United States Patent Office 3,422,350
Patented Jan. 14, 1969

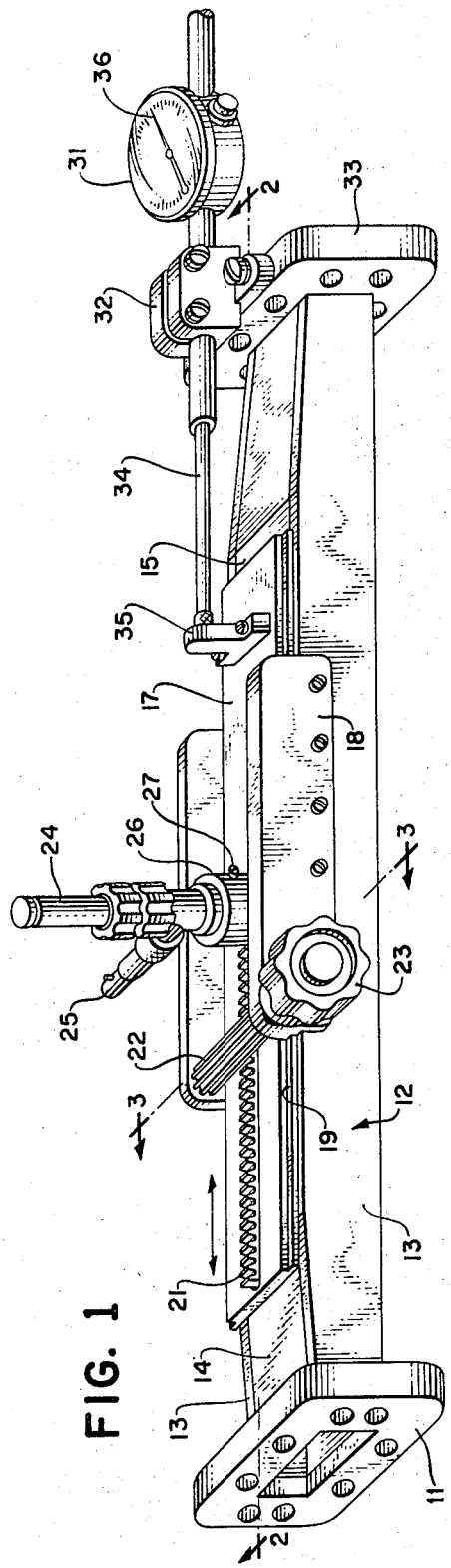

3,422,350
WAVEGUIDE SECTION SLIDING WALL CARRYING DETECTOR PROBE
Harry J. Goonan, Brooklyn, N.Y., assignor to The Western Union Telegraph Company, New York, N.Y., a corporation of New York
Filed May 9, 1963, Ser. No. 279,251
U.S. Cl. 324—95                                                1 Claim
Int. Cl. G01r 23/04; 25/02; 27/02

ABSTRACT OF THE DISCLOSURE

A microwave measuring apparatus includes a waveguide section on which is a probe carriage. The carriage has a flat plate slidably fitted over an aperture in a side wall in the waveguide section. The side wall is longitudinally bowed with a flat outer side so there are no wave reflections at beveled edges of the aperture. A probe is carried by the slidable plate. A micrometer gauge contacts the plate to indicate position and adjustment of the plate along the waveguide.

---

This invention relates to the measurement of the electrical characteristics of electromagnetic microwaves, and more particularly to an improved device for measuring their standing wave ratio in a waveguide.

It is well known to make such a measurement by means of a device known as a slotted section, which is a piece of waveguide with a narrow longitudinal slot along the center line of one of its broad walls into which an electric field probe variable longitudinally of the guide within the guide over a graduated scale, is inserted. When square wave modulated microwaves are fed through the section and the connected equipment under test, a measure of the maximum and the minimum rectified probe voltage obtained on a suitable detector during motion of the probe provides the data needed for ready computation of the standing wave ratio. The carriage bearing the probe, and the ways and mounts therefor for the carriage, as well as for the slotted waveguide structure, comprises a complex assembly requiring precise construction and accurate adjustment.

If accurately constructed with tolerances not in excess of one thousandth of an inch on the critical dimensions, slotted section for the frequencies of interest perform well for the majority of such measurements.

Because of inherent comprises in their construction, however, they are unsatisfactory in cases where the standing wave ratio to be measured is relatively low. This is so since the presence of the slot makes the characteristic impedance of the slotted section different from that of the unaltered line requiring an expensive and difficult matching operation and also since the slot changes the wave velocity and hence the wave length within the device. These discrepancies render the slotted section unsuited for the measurement of small reflections by the nodal shift method, and compromise the desirability of the device to some extent for other purposes by limiting it to a residual standing wave ratio, in commercial devices for carrier band frequencies, of about 1.02. In many instances this figure exceeds the quantity which it is desired to measure.

I have found that by employing the novel principles to be expounded in a construction of guide and movable probe, the measurement of such standing wave ratios can be freed of most of the inaccuracies inherent in the use of the slotted guide. It is found that under these circumstances the detector is not required to furnish measured values of voltage, but may operate merely as a null detector or minimum detector— a function much more accurately performed—and that it need not embody amplification which is strictly linear in nature. By this latter feature, construction of the detector may be greatly simplified and cheapened, and its range extended without added complexity.

In achieving my invention, I employ a section of measuring waveguide structure differing in no electrical essentials from the waveguide connecting it at one end (usually through a conventional ferrite isolator) to a source of suitably modulated microwaves of appropriate and stable frequency.

At the other end, there is connected the device having a standing wave ratio to be measured, followed by a waveguide shorting plug movable longitudinally within the guide, and having accurate means such as a micrometer depth gauge, or a dial gauge, for measuring longitudinal differential motion of the plug.

By making one of the broad waveguide walls of the measuring structure slidable longitudinally of the guide, providing it with a similar means of accurately measuring its motion, and fixedly mounting a voltage probe upon the movable portion thereof, I find that the group velocity of the waves within the guide is unaltered and the wavelength is unchanged within the structure such that only distance measurements are required to compute the standing wave ratio, provided that the structural details of the measuring device conform to the concepts later to be described.

In this way a measuring device is provided which is uniquely adapted to measure with high accuracy the standing wave ratio of such microwave components as bolted-together sections of waveguide, where an imperfectly smooth joint may be otherwise undetected, but which can result in serious distortion if excessive, or even if small, when multiplied in a plurality of successive joints.

The technique of applying the instant device to the measurement of the voltage standing wave ratio of a piece of microwave equipment is as follows:

With a stable source of modulated microwaves, an isolator, the instant device, the device under measurement, and an accurately graduated movable waveguide plug all connected in series as above described, determine $\lambda_{gsc}/2$ as the distance through which the plug must be moved to produce successive voltage minima, as shown by an unmoved detector coupled to the probe. $\lambda_{gsc}$ is then the wavelength in the shorting section. With the plug unmoved, determine $\lambda_{gsw}/2$ as the distance through which the probe must be moved to produce adjacent voltage minima. $\lambda_{gsw}$ is then the wavelength in the sliding wall section.

Determine the location of the voltage minimum for each 0.10 inch increment of short position throughout a wavelength.

Measure the distance D from the probe of any arbitrary reference plane of the instant device, and the distance S from the position of the short to the reference plane of the shorting section, in each instance.

Plot $B_1D + B_2S$ as a function of distance where the phase constant $B = 2\pi/\lambda$, the wavelength $\lambda$ being $\lambda_{gsw}$ for finding $B_1$ and $\lambda_{gsc}$ for finding $B_2$. A sinusoid having the double amplitude A results, from which $$\text{V.S.W.R.} = \frac{1 + \sin \frac{A}{2}}{1 - \sin \frac{A}{2}}$$

For cases of small reflection however, to which this invention is especially adapted, the above formula reduces without significant error to the more convenient formula $$\text{V.S.W.R.} = 1 + A$$

A clearer understanding of the invention may be had from a consideration of the following detailed description of a specific illustrative example of the best known method of practicing the same, when taken together with the drawings wherein:

FIG. 1 is a perspective view of a sliding wall section comprising the instant invention;

FIG. 2 is a sectional view taken on the line 2—2 of FIG. 1; and

FIG. 3 is a section view taken on the line 3—3 of FIG. 1.

Referring now to the drawings, there is seen in FIG. 1 a flange 11 for bolting to an incoming section of waveguide not shown, and to which is affixed a structure 12 having a narrow side 13 and a wide side 14, said narrow side being somewhat tapered at the terminal portions to retain the wide side 14 in an inclined position, as seen more clearly in FIG. 2. It thus is possible to provide an accurately flat upper surface 15 to the central portion of structure 12 while at the same time making a reflectionless transition at the knife edges 16 to the upper wall 17 slidable thereover. This may be done by milling, grinding, or otherwise flat working the upper surface of structure 12, which is seen to be so shaped as automatically to produce the desired close fit on the flat surface of upper wall 17.

Cheek piece 18 bolted to structure 12 is recessed to retain tongues such as 19 on upper wall 17 so that guided longitudinal sliding thereof may occur under urging of the rack 21 when driven by the pinion 22 journalled in piece 18 as occurs when the knob 23 fastened to pinion 22 is turned.

A probe 24 having an electrical connector 25 is retained in the bushing 26, which is securely affixed to upper wall 17, by means of a set screw 27.

A machinist's dial gauge 31 is mounted in a fixture 32 secured to the flange 33 and has a longitudinally movable and spring loaded sensing shaft 34 resting on the bracket 35 which is secured to upper wall 17.

Pointer 36 of gauge 31 thus indicates longitudinal motion of probe 24 in appropriate units of thousandths of an inch.

It will be observed that in contrast to the relatively complex and precise guiding structure required for the probe of a slotted section, as heretofore mentioned, it is inherent in the instant invention that little or no such structure is required since the carriage rests on and is guided by the waveguide section itself.

It is a further advantage of the invention that it is unnecessary to undertake the difficult experimental determination of the relationship between $\lambda_s$ and $\lambda_g$, as otherwise would be required for computation, since they are identical.

A still further advantage of the invention is that the parameters uniquely determinable by its use are effective greatly to simplify the subsequent computation of V.S.W.R.

Although this invention has been described in terms of a specific illustrative example of the preferred method of practicing it, it will be apparent that certain modifications and enlargements will occur to those skilled in the art which do not, however, depart from the essential spirit of the invention, and it is therefore intended that the invention be limited only by the appended claim.

I claim:

1. A microwave measuring apparatus comprising:
    (a) a rectangular waveguide section having
        (1) first and second flat, parallel, vertical walls, each of said walls having straight bottom edges and opposite longitudinally extending top edges, said top edges comprising straight horizontal top central sections and sloping end sections;
        (2) a third flat horizontal wall joined at opposite edges to the bottom edges of the first and second walls; and
        (3) a fourth wall opposite the third wall, said fourth wall being longitudinally arched and joined at its lateral edges to the top edges of the first and second walls so that the fourth wall is furthest from the third wall at the midpoint of the waveguide section, said fourth wall having a central portion with flat outer side disposed in a plane parallel to the third wall, and having a rectangular aperture formed in said central portion, with opposing transversely extending edges of said aperture being sharply beveled due to the arched formation of the fourth wall and the flat formation of the outer side of said central portion;
    (b) a probe carriage comprising:
        (1) a flat plate slidably abutting the outer side of the said central portion and overlaying the aperture so that the waveguide section is free of internal discontinuities at the beveled edges of the aperture;
        (2) a probe carried by said plate extending into the waveguide section through a close fitting hole in the plate;
    (c) a rack gear on said plate;
    (d) a stationary support on the waveguide section;
    (e) a pinion rotatably journaled on said support and engaged with the rack gear to move the plate longitudinally of the waveguide section; and
    (f) a dial gauge mounted at one end of the waveguide section, said dial gauge having a spring loaded movable shaft contacting and biasing the probe carriage for amplifying and indicating on said gauge longitudinal movements of the probe carriage with respect to the waveguide section.

References Cited

UNITED STATES PATENTS

| 2,989,699 | 6/1961 | Hopfer | 324—95 |
| 2,571,055 | 10/1951 | Nordsieck | 324—95 |
| 2,562,281 | 7/1951 | Mumford | 324—95 |
| 2,924,797 | 2/1960 | Robertson | 333—34 XR |
| 2,996,692 | 8/1961 | Christensen | 324—95 XR |
| 3,007,123 | 10/1961 | Andrews | 333—95 |
| 3,113,267 | 12/1963 | Oh | 250—39 X |

RUDOLPH V. ROLINEC, *Primary Examiner.*

E. F. KARLSEN, *Assistant Examiner.*

U.S. Cl. X.R.

324—58.5